Jan. 23, 1940.　　　A. J. WILSON　　　2,188,213
PORTABLE BATHHOUSE
Filed June 12, 1939　　　2 Sheets-Sheet 1
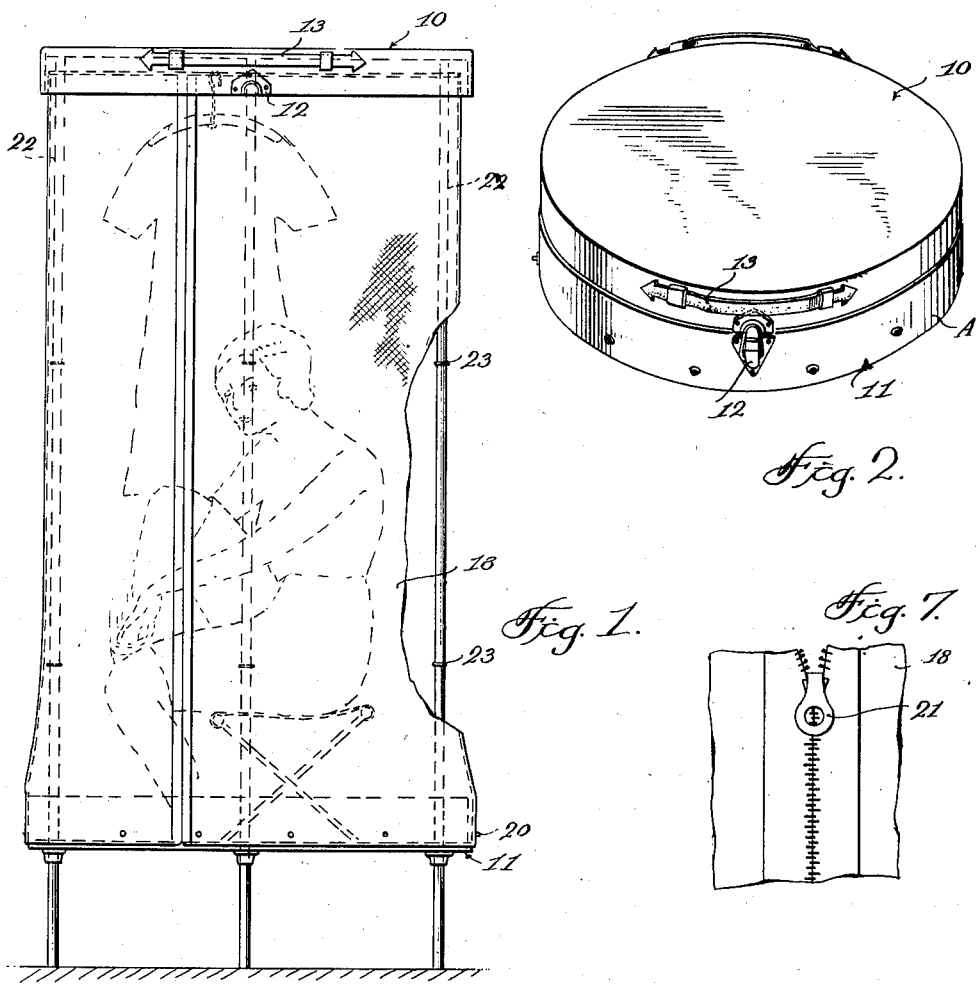
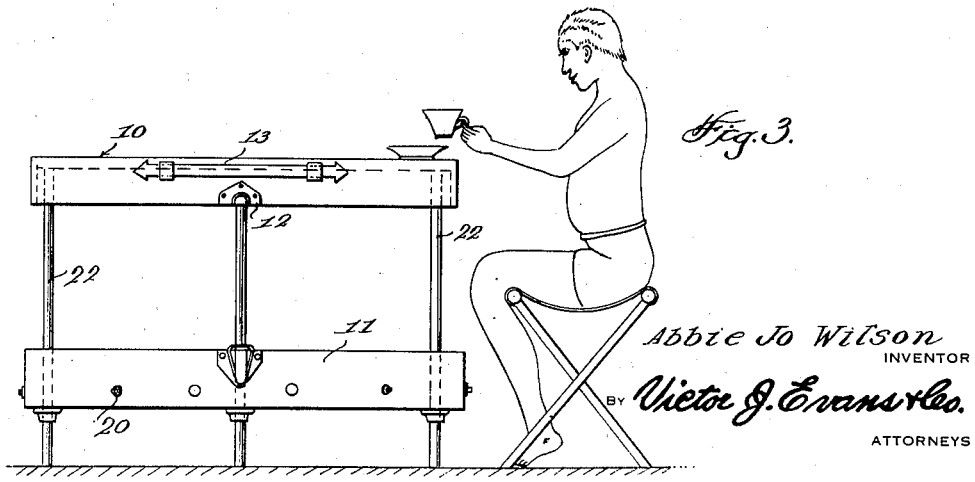
Abbie Jo Wilson
INVENTOR
BY Victor J. Evans & Co.
ATTORNEYS

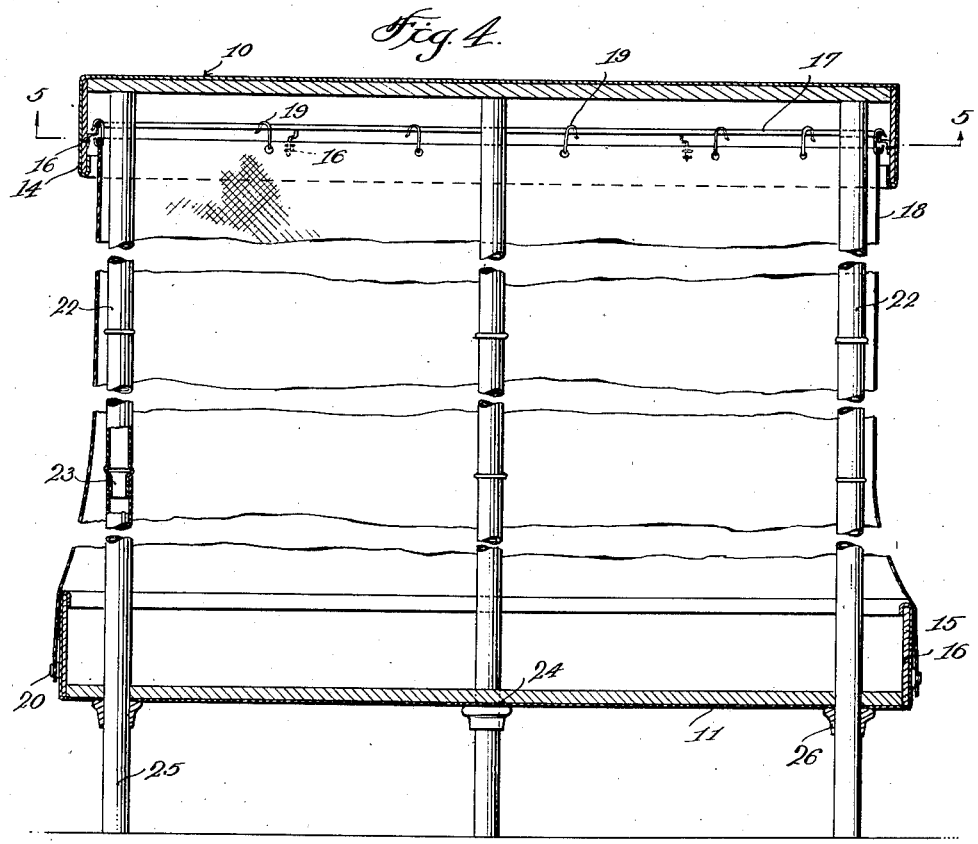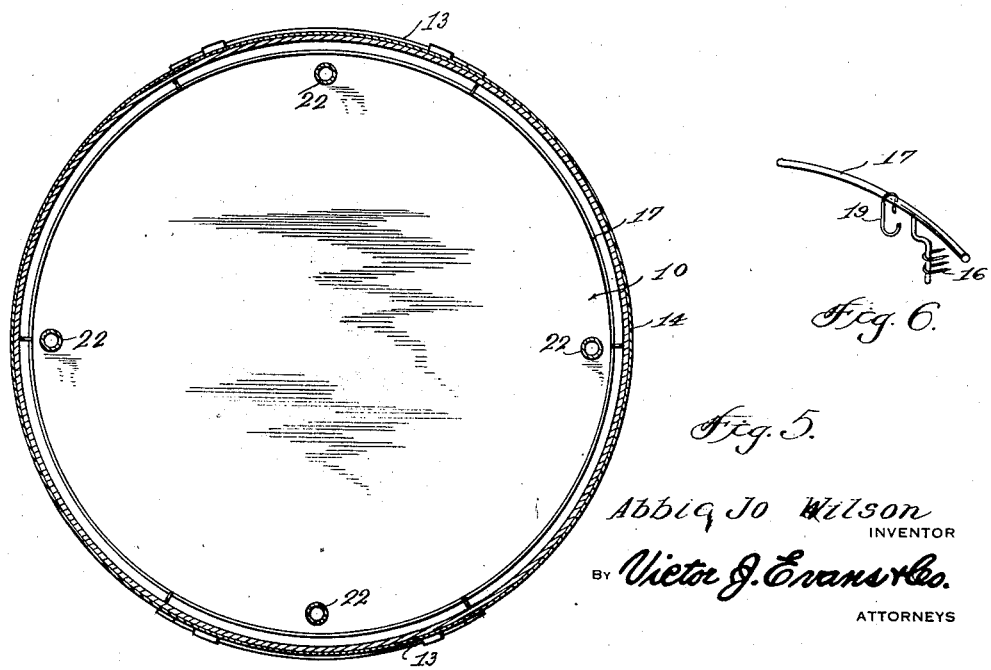

Patented Jan. 23, 1940

2,188,213

UNITED STATES PATENT OFFICE 2,188,213

PORTABLE BATHHOUSE

Abbie Jo Wilson, Orono, Maine

Application June 12, 1939, Serial No. 278,794

4 Claims. (Cl. 135—5)

The invention relates to a convertible device and more especially to a portable bathhouse or tent.

The primary object of the invention is the provision of a device of this character wherein through the construction thereof it can be converted into a tent, bathhouse, closet, or the like and for use as a table, thus rendering the device useful for campers, bathers, or for sheltering purposes when traveling in the open, the device being susceptible of being knocked down into compact form and in a hand bag condition so that it may be readily carried or stored in the least possible space.

Another object of the invention is the provision of a device of this character wherein the construction thereof is novel in its entirety being readily portable, set up and knocked down with dispatch and when set up may function as a closet, bathhouse, storage compartment or as a table.

A further object of the invention is the provision of a device of this character wherein the same when knocked down presents a hand bag in which gadgets, clothing or other articles can be stored or packed and such hand bag may be carried in the hand of a person or placed within a motor vehicle and upon setting up said device being susceptible of various uses.

A still further object of the invention is the provision of a device of this character which is simple in its construction, thoroughly reliable and efficient in operation, especially adaptable for outdoor service as a tent, bathhouse, table, etc., and is inexpensive to manufacture.

With these and other objects in view, the invention consists in the features of construction, combination and arrangement of parts as will be hereinafter more fully described in detail, illustrated in the accompanying drawings, which disclose the preferred embodiment of the invention and pointed out in the claims hereunto appended.

In the accompanying drawings:

Figure 1 is an elevation partly broken away of the device constructed in accordance with the invention and set up as a bathhouse.

Figure 2 is a perspective view showing the device knocked down and simulating a hand bag.

Figure 3 is a side elevation of the device converted into a table.

Figure 4 is an enlarged vertical longitudinal sectional view through the device set up as a bathhouse, tent or the like.

Figure 5 is a sectional view taken on the line 5—5 of Figure 4 looking in the direction of the arrows.

Figure 6 is a perspective view of a hanger rail employed in the device.

Figure 7 is a fragmentary plan view showing the zigzag fastener arrangement for the device.

Similar reference characters indicate corresponding parts throughout the several views in the drawings.

Referring to the drawings in detail, the device 10 constituting the present invention comprises a sectional casing A having the sections 10 and 11 thereof of matched circular form and of sizes with respect to each other so that the section 10 will telescopically partially interfit with the section 11 when the device is in a knockdown compact condition. These sections 10 and 11 are separably fastened in their matched interfitted relation through the medium of trunk or hand bag latching devices, one being indicated at 12. Two of these devices are preferably employed and arranged diametrically opposite each other exteriorly of the sections 10 and 11 so that they may be separably fastened with each other. The section 10 is equipped with hand grips or handles 13 for the convenient carriage of the device when in a knockdown compact condition or for the easy handling thereof.

The section 10 has formed therewith an annular rim 14 and the section 11 has formed therewith an annular rim 15 while inwardly of the rim 14 and bracketed thereto as at 16 is a circular hanger rail 17 to which is separably hooked a water proof curtain 18, the hooks being indicated at 19. This curtain at the lower end thereof is detachably fastened to the rim 15 of the section 11 exteriorly thereof through the use of suitable separable snap fasteners 20 while the curtain longitudinally thereof is divided and the dividing edges have in association therewith a zipper fastener 21. In lieu of the zipper fastener 21 any other suitable type of fastener may be substituted, but in the use of this zipper fastener it enables ventilation by allowing a portion thereof to be unfastened, particularly close to the top of the device. In event that any other type of fastener in substitute for the zipper fastener be used, it is contemplated to provide for ventilation and this may be accomplished by having a ventilating opening in the curtain when the device is used as a bathhouse. Thus this dividing of the curtain longitudinally permits admission and exit to the bathhouse set up of the device as will be hereinafter fully described.

For the bathhouse set up of the device there is employed a series of sectional tubular posts or uprights 22 the sections of each being nipple interfitted as at 23 with each other. These posts or uprights 22 with the sections thereof in their assembled relation are disposed vertically in spaced relation to each other and support the section 10 which is elevated and rests upon the upper ends of said posts or uprights while the lower portions of these posts or uprights are passed through suitable openings 24 provided in the section 11 to slightly elevate this section from the foundation and have the lower ends 25 of these posts or uprights functioning as supporting legs. It is to be understood, of course, that these lower ends 25 of the posts or uprights serve as supporting legs and can be anchored in the ground so that the base or bottom 11 can rest directly thereon and this is contemplated in the use of the device. The ends 25 have removably fitted therewith rest bearings 26 for the section 11. In this manner a tent, bathhouse, or closet is set up for use.

In Figure 3 of the drawings the sections 10 and 11 are disposed in association with selected sections of the posts or uprights 22 so that the device in this converted condition will effect a table being clearly illustrated in said Figure 3.

When the device is to be knocked down or brought into compact condition for the carrying thereof or for the storing of the same the posts or uprights 22 are removed from the sections 10 and 11 and their sections are separated from each other being readily stored in the said sections 10 and 11 when the same are interfitted with each other to assume a hand bag arrangement. Of course, the curtain 18 is detached from the section 11 before this section is interfitted with the section 10 in a manner as shown in Figure 2 of the drawings. Furthermore the curtain 18 may be detached from the rail 17 interiorly of the section 10. These sections 10 and 11 when the device is in a completed knock down condition and interfitted with each other will serve to permit of storing of gadgets, clothing, or other articles at the option of the user of the device.

What is claimed is:

1. A device of the kind described comprising a sectional case having the sections thereof adapted for partial telescopic interfitting with each other, a hanger rail interiorly of one of said sections of the case and bracketed thereto, a curtain separably engaged with said rail, means for detachably fastening the curtain to the other section of said case, and a plurality of sectional posts associated with the sections of the case for holding the said sections in vertically separated relation to each other.

2. A device of the kind described comprising a sectional case having the sections thereof adapted for partial telescopic interfitting with each other, a hanger rail interiorly of one of said sections of the case and bracketed thereto, a curtain separably engaged with said rail, means for detachably fastening the curtain to the other section of said case, a plurality of sectional posts associated with the sections of the case for holding the said sections in vertically separated relation to each other, and means for fastening the sections of the case when partially telescopically interfitted with each other.

3. A device of the kind described comprising a sectional case having the sections thereof adapted for partial telescopic interfitting with each other, a hanger rail interiorly of one of said sections of the case and bracketed thereto, a curtain separably engaged with said rail, means for detachably fastening the curtain to the other section of said case, a plurality of sectional posts associated with the sections of the case for holding the said sections in vertically separated relation to each other, means for fastening the sections of the case when partially telescopically interfitted with each other, and bearings separably fitted with the posts for the rest engagement therewith of one of the sections of the case.

4. A device of the kind described comprising a sectional case having the sections thereof adapted for partial telescopic interfitting with each other, a hanger rail interiorly of one of said sections of the case and bracket thereto, a curtain separably engaged with said rail, means for detachably fastening the curtain to the other section of said case, a plurality of sectional posts associated with the sections of the case for holding the said sections in vertically separated relation to each other, means for fastening the sections of the case when partially telescopically interfitted with each other, bearings separably fitted with the posts for the rest engagement therewith of one of the sections of the case, and a zipper fastener associated with the curtain for the opening and closing thereof.

ABBIE JO WILSON.